United States Patent
Valli

(10) Patent No.: US 11,149,461 B2
(45) Date of Patent: Oct. 19, 2021

(54) AUTOMATED PARKING FOR CHARGING ELECTRIC OR HYBRID VEHICLE AND ASSOCIATED METHOD

(71) Applicant: SOTEFIN PATENTS SA, Lugano (CH)

(72) Inventor: Giovanni Valli, Cantello (IT)

(73) Assignee: SOTEFIN PATENTS SA, Lugano (CH)

( * ) Notice: Subject to any disclaimer, the term of this patent is extended or adjusted under 35 U.S.C. 154(b) by 653 days.

(21) Appl. No.: 16/062,781

(22) PCT Filed: Aug. 24, 2016

(86) PCT No.: PCT/IB2016/055048
§ 371 (c)(1),
(2) Date: Jun. 15, 2018

(87) PCT Pub. No.: WO2017/109594
PCT Pub. Date: Jun. 29, 2017

(65) Prior Publication Data
US 2020/0282852 A1    Sep. 10, 2020

(30) Foreign Application Priority Data

Dec. 23, 2015 (CH) .................................. 01905/15

(51) Int. Cl.
*E04H 6/42* (2006.01)
*B60L 53/30* (2019.01)
(Continued)

(52) U.S. Cl.
CPC ................ *E04H 6/42* (2013.01); *B60L 53/16* (2019.02); *B60L 53/18* (2019.02); *B60L 53/305* (2019.02);
(Continued)

(58) Field of Classification Search
CPC .. E04H 6/42; E04H 6/22; E04H 6/424; B60L 53/305; B60L 53/36; B60L 53/16; B60L 53/31; B60L 53/18
(Continued)

(56) References Cited

U.S. PATENT DOCUMENTS 10,377,253 B2 *  8/2019  Lee ..................... H01R 13/2478
10,689,874 B2 *  6/2020  Tang ......................... E04H 6/24
(Continued)

FOREIGN PATENT DOCUMENTS

GB          2438979       12/2007
WO         2010114455      10/2010
(Continued)

OTHER PUBLICATIONS

International search report and written opinion issued for PCT/IB2016/055048 dated Dec. 5, 2016.

*Primary Examiner* — Suresh Memula
(74) *Attorney, Agent, or Firm* — Silvia Salvadori, P.C.; Silvia Salvadori

(57) ABSTRACT

Charging device of hybrid or electric vehicles in an automated parking, said device (10) comprising: —a column (100) substantially developing vertically; —a current socket (110) positioned in substantial correspondence of a first terminal portion of the said column (100), and—a supporting element (130) of the said column (100), substantially developing along a direction which is orthogonal respective to the direction defined by said column (100), wherein: —said device (10) of recharge comprises a recess or profile (135) suitable for allowing the introduction of a tooth of a carriage for moving vehicles; —a plurality of electric contacts (195), each of which is cabled with a respective electric
(Continued)

contact of the said current socket (110), wherein said plurality of electric contacts (195) is positioned in correspondence of a second terminal portion of the said column (100) opposed respective to said first terminal portion of the said column (100); —said electric contacts (195) being electrically disengaged in case the device (10) is not electrically coupled with coupling contacts of a system of automated parking.

10 Claims, 9 Drawing Sheets

(51) Int. Cl.
  *B60L 53/36* (2019.01)
  *B60L 53/16* (2019.01)
  *B60L 53/31* (2019.01)
  *B60L 53/18* (2019.01)
  *E04H 6/22* (2006.01)

(52) U.S. Cl.
  CPC ............... *B60L 53/31* (2019.02); *B60L 53/36* (2019.02); *E04H 6/22* (2013.01); *E04H 6/424* (2013.01)

(58) Field of Classification Search
  USPC ........................................................ 320/119
  See application file for complete search history.

(56) References Cited

U.S. PATENT DOCUMENTS

| 2011/0140658 | A1* | 6/2011 | Outwater | B60L 53/35 320/109 |
| 2018/0258663 | A1* | 9/2018 | Maier | E04H 6/424 |

FOREIGN PATENT DOCUMENTS

| WO | 2010131615 | 11/2010 |
| WO | 2011084441 | 7/2011 |

* cited by examiner

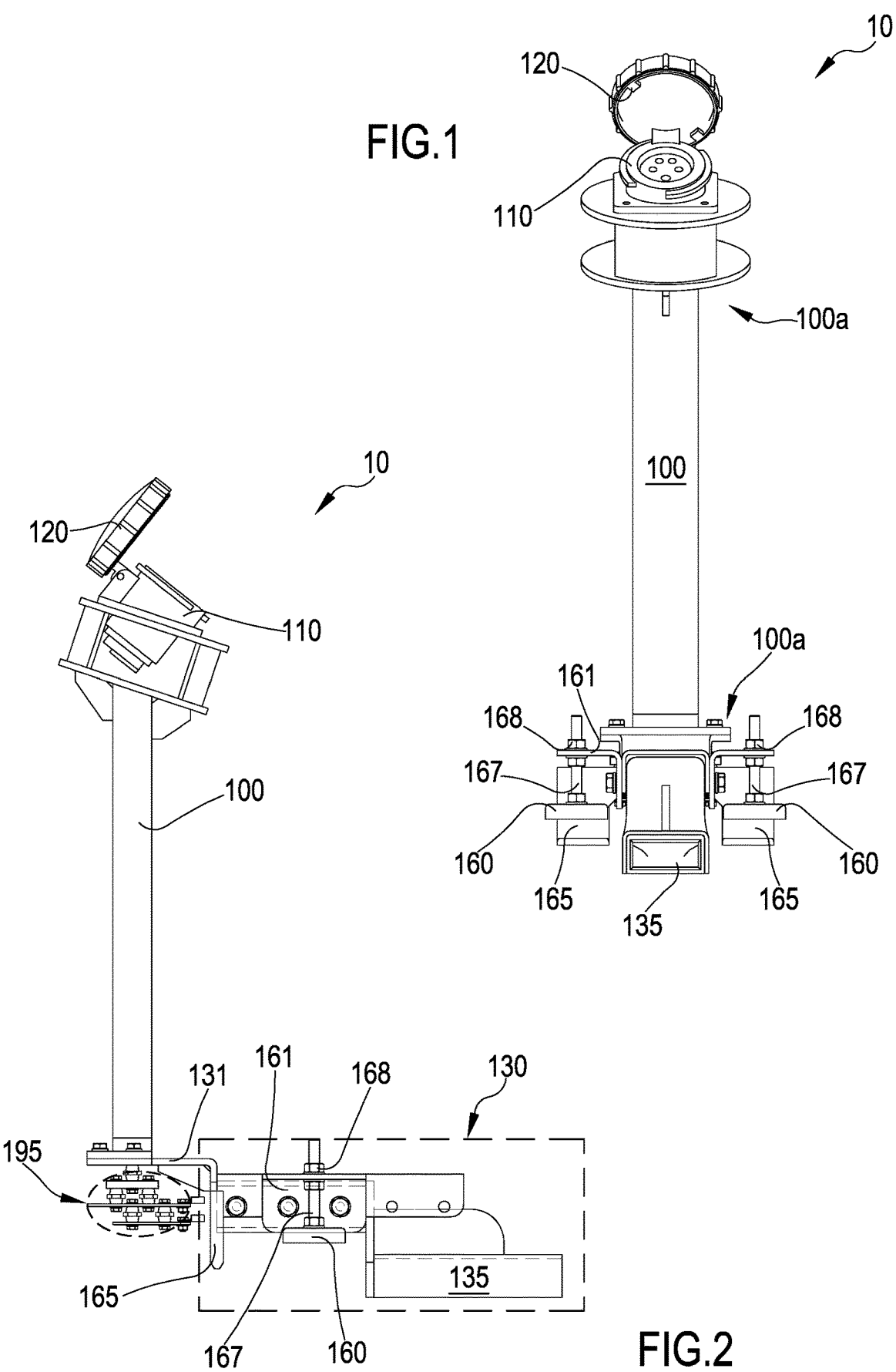

AUTOMATED PARKING FOR CHARGING ELECTRIC OR HYBRID VEHICLE AND ASSOCIATED METHOD

RELATED APPLICATIONS

This application is a US national phase application of international application number PCT/IB2016/055048, filed 24 Aug. 2016, which designates the US and claims priority to Swiss application CH 01905/15 filed 23 Dec. 2015, the contents of each of which are hereby incorporated by reference as if set forth in their entireties.

FIELD OF THE INVENTION

The present invention refers to a charging device, and in detail concerns a charging device of hybrid or electric vehicles in an automated parking.

The present invention further concerns an automated parking comprising said charging device.

The present invention further concerns a method of recharging for an electric or hybrid vehicle in an automated parking.

BACKGROUND ART

The automated parking are structures suitable for housing vehicles wherein the vehicle user leaves it in correspondence of an entrance zone for then activating a procedure of automated parking of said vehicle through electromechanical devices. Equivalently, the vehicle is extracted from the automated parking by means of a reversed procedure, always by means of said electromechanical devices. In the automated parking said operation takes place automatically, for example after the user presses a button or other known means of activation for the procedure of parking and extraction.

Recently have been developed electric or hybrid cars, wherein the traction is no more given by an endothermic motor but is provided by a battery. Said electric or hybrid cars, for being usable are characterized by the need of being recharged by means of electric current. Traditionally the recharge of an electric or hybrid car takes place through a current socket wherein a plug connected to the car itself is inserted.

In many cities, current sockets are arranged in proximity of columns in public parking spaces.

The applicant has noticed that in the automated parking the operation of recharge of the vehicle is not always easy, since the user typically cannot access the area where vehicles are stocked; in fact in said area there are guides for moving carriages and other mechanical structures that could be dangerous for the users also because they are automatically actuated case the vehicles shall be moved or extracted from said parking.

The applicant has furthermore noticed that the best moment to recharge an electric vehicle is actually the moment wherein the vehicle is left parked at home, since typically this represents most lasting period of parking. Often, the vehicle is left parked an our own house during at least the arch of a night and, consequently, there is sufficient time for letting it be fully recharged.

The applicant has furthermore noticed that concerning the electric vehicles, the automated parking represents therefore a limitation, and the user of the electric vehicle for recharging it should every time extract it from the automated parking and find a column with a recharging current socket.

Nonetheless, it is underlined that the recharge of an electric vehicle takes place by means of a current socket at high voltage, that is to say up to 500V, with values which are dangerous for the human health. In case of accidental contact with the electric contacts of the socket, there is therefore a concrete risk of electrocution or anyway of transmission of an electric shock to the user of the vehicle.

The scope of the present invention is therefore to describe a charging device for hybrid or electric vehicles in an automated parking capable of solving the aforementioned drawbacks.

A further scope of the present invention is further to describe an automated parking for hybrid or electric vehicles, comprising said charging device.

A further scope of the present invention is finally to describe a method of recharging of electric and hybrid vehicles in an automated parking.

SUMMARY OF THE INVENTION

According to the present invention is realized a charging device of hybrid or electric vehicles in an automated parking, said device comprising:
  a column substantially developing vertically
  a current socket positioned in substantial correspondence of a first terminal portion of the said column, and
  a supporting element of the said column developing substantially along a direction orthogonal with respect to the direction defined by said column wherein:
  said charging device comprises a recess or profile suitable for allowing the introduction of a tooth of a carriage for moving vehicles;
  a plurality of electric contacts, each of which is cabled with a respective electric contact of the said current socket, wherein said plurality of electric contacts is positioned in correspondence of a second terminal portion of the said column opposed with respect to said first terminal portion of said column;
  said electric contacts being electrically not powered when the device is not electrically coupled with coupling contacts of a system of automated parking.

According to an aspect of the present invention, said supporting element comprises a plurality of magnetized elements susceptible of allowing the removable adhesion of said device to a supporting plate.

According to an aspect of the present invention said magnetized elements are positioned respectively on the two sides of said recess or profile.

According to an aspect of the present invention, said device comprises a covering cap of said socket, said cap being removable or rotatable for accessing said socket.

According to an aspect of the present invention said socket is inclined respective to a vertical direction.

According to an aspect of the present invention said device comprises, in proximity of said second end a plurality of means of removable blocking of said device on a slotted supporting plate, said means of removable blocking being such that said device rests in a substantially erected position when positioned on said slotted supporting plate.

According to an aspect of the present invention, said magnetized means are a couple of magnets.

According to an aspect of the present invention, said magnetized means are installed in such a way to axially slide with removable block with respect to said supporting element.

According to an aspect of the present invention each of said magnetized means is fixed to said supporting element by means of a couple nut/bolt suitable for allowing said axial sliding respective to said supporting element and for blocking the respective magnetized means respective to said supporting element, and wherein said axial sliding respective to said supporting element takes place along a direction substantially parallel to the direction defined from said column.

According to the present invention it is further realized an automated parking with means of recharge of hybrid or electric vehicles, said automated parking comprising a surface of temporary parking with guiding marks, in correspondence of thereof a vehicle to be parked in said automated parking can be positioned, and wherein in correspondence of a surface of temporary parking with guiding marks there is a supporting plate provided with slots for positioning of means of removable blocking of a charging device of hybrid or electric vehicles according to any of the annexed claims and in accordance to the aforementioned features, and a plurality of coupling contacts, positioned in said parking station on a predetermined area which is distinguished respective to said station of introduction and extraction of the vehicle, wherein said coupling contacts are configured for coupling electrically with said electric contacts of said device, and wherein said coupling contacts are electrically fed and feed said electric contacts of said device only in case of contact thereto.

According to an aspect of the present invention, said automated parking comprises a carriage for moving vehicles, in use movable between said guides, and suitable for translating and/or hoisting said vehicle from and to a surface of temporary parking with guiding marks, wherein said carriage for moving vehicles comprises a tooth suitable for introducing within said recess or profile and is configured for move said vehicle together with said device from said station of introduction and extraction of the vehicle to said station of parking in a predetermined area, in a parking configuration wherein said electric contacts of said device are arranged in electric contact with the coupling contacts and are electrically fed therefrom.

According to an aspect of the present invention, said supporting plate comprises a metal contact area in use positioned below said magnets, and a plurality of slotted holes of engagement of said device positioned frontally respective to said metal contact area.

According to an aspect of the present invention, said electric contacts, said coupling contacts and said socket are conceived for withstanding electric voltages greater or equal to 200V AC and for withstanding electric currents up to 60 A, and wherein said socket is a IPXXB or IPXXD grade socket.

According to the present invention is finally realized a method of automated recharge of an electric or hybrid vehicle in an automated parking, said method being characterized in that it comprises:

a step of positioning of said vehicle in a first position in a station of introduction and extraction of the vehicle in said automated parking;
a step of positioning the device according the aforementioned features on a supporting plate, maintaining the electric contacts of said device not powered;
a step of connecting said socket to a vehicle's socket by means of an electric connection cable;
a step of conjoined motion of said vehicle together with said device up to a station of parking in a predetermined area in correspondence of which there are a plurality of coupling contacts, configured for being removably put in contact with said electric contacts,
wherein said step of conjoined motion of said vehicle together with said device takes place by means of a carriage for automated motion of vehicles.

According to a preferred and non-limiting aspect of the present invention, said step of positioning of said device on said supporting plate comprises a step of magnetic removable engagement of a plurality of magnets of said device on a contact area of said supporting plate; and wherein said magnetic engagement is forced to be removed by a mechanic action of the conjoined motion of the vehicle and of the device being performed by said carriage for automated motion of vehicles.

According to an aspect of the present invention, at the moment of connecting said electric contacts with said coupling contacts, said electric contacts of said device become electrically engaged.

According to an aspect of the present invention in correspondence of the said from said parking station on a predetermined area said vehicle and said device are not accessible to the user.

DESCRIPTION OF THE FIGURES

The invention will be hereinafter described referring to a preferred and non-limiting embodiment, and with the support of the annexed figures wherein:

FIG. 1 shows a front view of a charging device of hybrid or electric vehicles in an automated parking;

FIG. 2 shows a lateral view del device of FIG. 1;

DETAILED DESCRIPTION OF THE INVENTION

Figure 3:
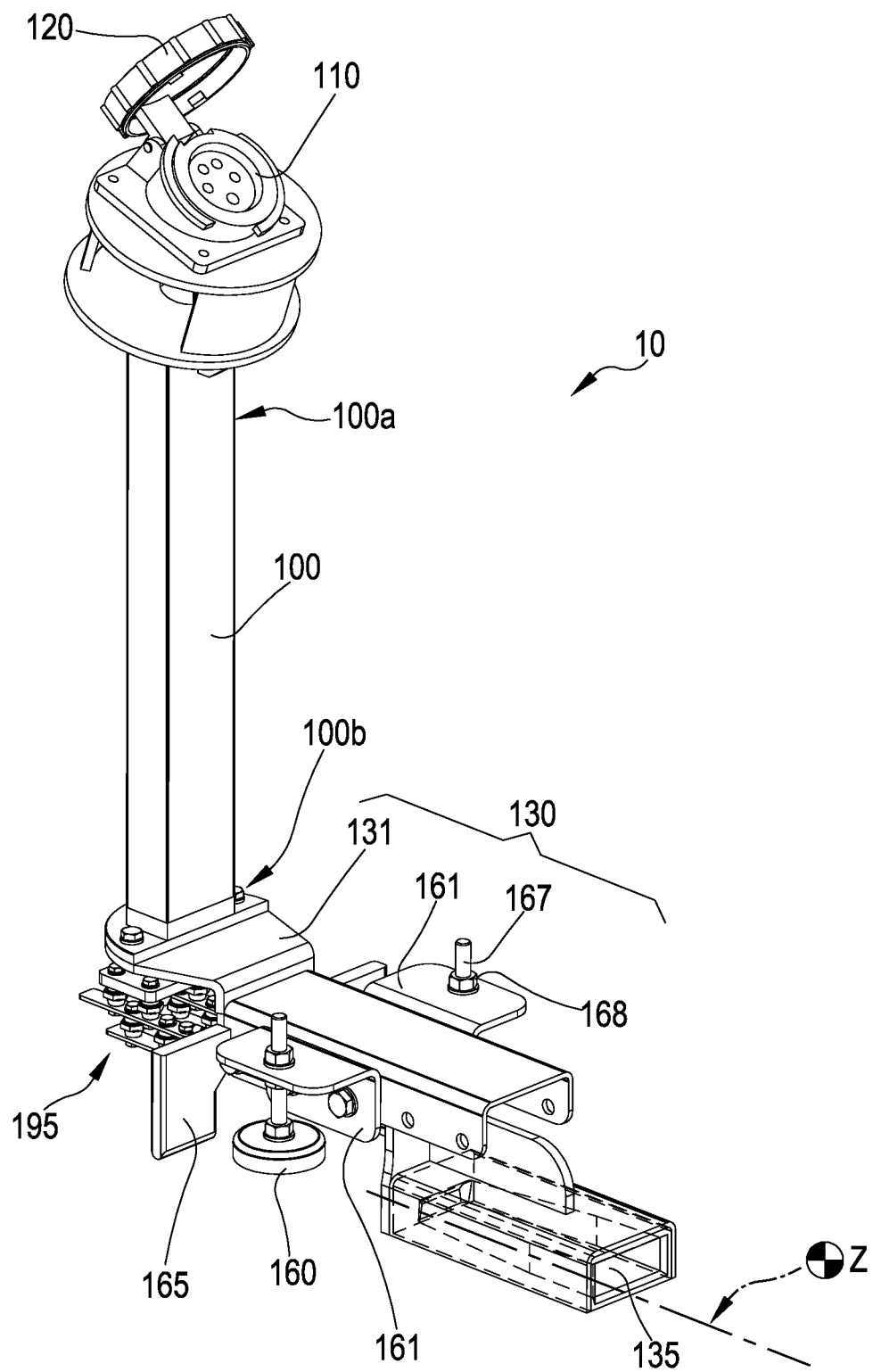
FIG. 3 shows a perspective view device of FIG. 1.

With the reference number 10 is shown in its complex a charging device of hybrid or electric vehicles in an automated parking.

The device 10 comprises a column a 100 substantially developing along a direction which is vertical with respect to the ground, that in an its first terminal portion 100a has a current socket 110 through which it is possible to recharge a vehicle of an electric or hybrid type.

The column 100, in correspondence of a second terminal portion 100b opposite respective to the first terminal portion 100a has a supporting element 130 that is represented in detail by an L-shaped bracket 131 that is substantially fixed in correspondence of the ground.

In the annexed figures, the column 100 is represented by a metal box with rectangular section that anyway shall not be intended as limiting since other embodiments of the box could be equivalently realized.

The supporting element 130 comprises furthermore a box developing along a direction substantially orthogonal respective to the direction along which it is developed said column 100; below said box there is a recess or profile 135 suitable for housing in use a tooth of a carriage for moving vehicles to promote said column. In the annexed figures, the direction along which the box develops, that is also the direction of maximum horizontal development of the recess or profile 135, is shown with the axis Z.

In correspondence of the left and right side of said box there are a couple of magnets or calamite 160. Each magnet 160 is fixed on said box by means of a respective L-shaped bracket 161.

Each magnet 160 can be set in height by means of a couple bolt and nut 167, 168 that introduce within a through hold of the respective L-shaped bracket 161. Advantageously this allows of regulating the relative height between the magnet 160 and the box allowing a better coupling with a support for contact of the magnet itself, that will be better described hereinafter. The setting of the height of the magnet takes place along a direction which is parallel to the direction along which the column 100 develops.

Preferably but in a non-limiting extent, said current socket 110 is inclined respective to a vertical direction. Advantageously this allows the user to introduce more easily the plug into the socket, and furthermore represents a way for defining easier the direction along which the column 100 shall be coupled when installed on its support.

Furthermore, in correspondence of the socket 110 there is a cap or closure cover 120. In a preferred and non-limiting embodiment of the present invention, said cap or closure cover 120 is rotatable respective to said socket 110 and is hinged in correspondence of lateral surface thereof.

Alternatively said cap or closure cover 120 could be simply openable and closable by means of extraction from said socket. This advantageously allows using the socket 110 also in conditions and environments wherein it could be subject to sprays or spurts of water for example due to rain without for this causing an increase of the harm of use of system. The cap or closure cover 120 therefore realizes an element of covering of the electric contacts which there are inside the socket from dust and water sprays.

Preferably but in a non-limiting extent, the socket 110 has electric contacts suitable for transfer electric power with a voltage between about 200V and 500V and with currents beyond 10 A. The today's rule IEC 62-196 requires in fact currents of recharge between 16 A and 32 A with single-phase recharging plants at 250V or up to 63 A with voltages of 480V.

Preferably, furthermore, the socket 110 has a IPXXB or IPXXD standard. Therefore, also when powered, the finger of the user could not reach the active parts, that is to say the contacts, avoiding the risk of electrocution.

In correspondence of the second terminal portion of the said column 100, there is a plurality of electric contacts 195. Said electric contacts are one by one coupled with electric contacts that are present on the socket 110 by means of electric connection cables that pass into column 100. The electric contacts are conceived in such a way to allow the transmission of electric powers with the aforementioned features.

Preferably, in any case, the electric connection cables between the electric contacts 195 of the second end portion of the column 100 and the socket 110, lay into the box, and this advantageously allows to reduce the risk that the cables can be accidentally removed from the contacts of the column 100.

As it is shown in detail in FIG. 2, the L-shaped bracket 131 of the supporting element 130 has a first plate or substantially horizontal surface and a second plate or substantially vertical surface, this last conjoined with the recess or profile 135. The electric contacts 195 are positioned below the first substantially horizontal wall. This allows keeping the electric contacts 195 more hidden from potential shocks, that could bend them, causing a reduction of the effectiveness of the electric coupling as well as risks of sparks or short circuits, particularly dangerous considered the electric power involved.

As it is shown in figures from 1 to 3, in correspondence of the second terminal portion lower of the column 100, on the left and on the right respective to the electric contacts 195 there is a plurality of means of connection of said column with a metal support 170 of the automated parking. In a preferred and non-limiting embodiment of the present invention, shown in the annexed figures, said means of connection are represented by a couple of metal wings 165 susceptible introduce themselves in respective slotted recesses of a metal support 170 that will be better described hereinafter. The metal wings extend in a direction substantially parallel to the direction defined by the column 100.

As it is shown in detail in FIG. 1, it is possible to see that the metal wings are positioned in substantial axial correspondence with each of the magnets or calamite 160.

As briefly mentioned in the previous paragraphs, the device 10 object of the present invention is part of an automated parking for motor vehicles. In the context of the present invention, for "automated parking" it is meant a parking wherein it is possible to move a vehicle in a first station and subsequently, by means of means of user interface, cause the activation of an automated motion system of the vehicle using the motion carriage, which performs the translation, the hoisting and/or lowering and/or the rotation of said vehicle up to an area of parking or station of parking with predetermined slot 300 within which the vehicle is actually placed in a predefined parking slot, by means of a procedure of automated motion assisted by the control of an electronic computer and by electrically motored means for controlling said motion carriage.

Figure 4:
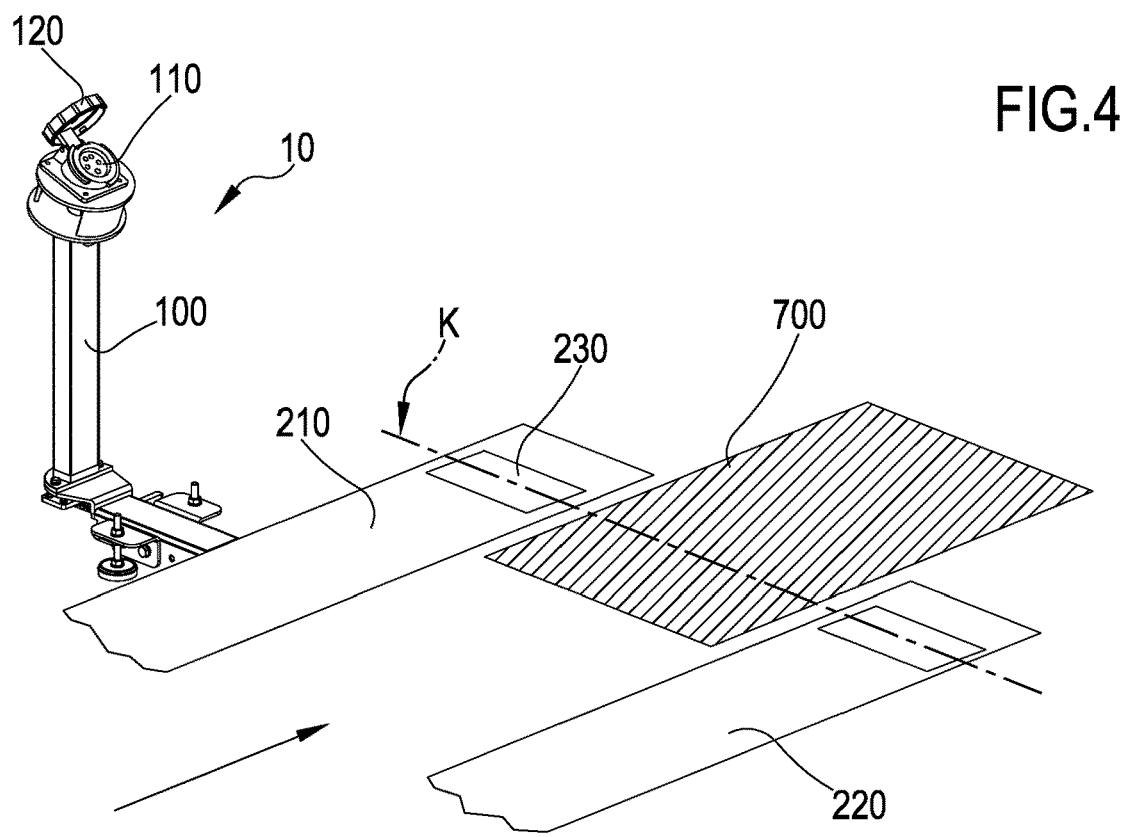
FIG. 4 shows a schematic view of a portion of an automated parking where there is the device of FIG. 1.

In FIG. 4 is schematically shown the configuration of the automated parking in correspondence of a first elevation. Preferably, but in a non-limiting extent, said first elevation is at the road level.

In correspondence of the first elevation the automated parking comprises a surface of temporary parking with guiding marks 210, 220. Said guiding marks 210, 220 can be painted or realized with surface differing respective to the rest of the surface of temporary parking, and in a non limiting embodiment shown in the annexed figures are realized by means of means of visual guidance which are parallel and separated each other, onto which the vehicle is parked by the user by means of a motion along the direction shown by the arrow.

Mechanical pursuits 230 allow the user to detect if the vehicle is correctly positioned on the surface of temporary parking with guidance marks 210, 220 in such a way that the carriage for moving the vehicle 700 can introduce itself between the guiding marks, and preferably by means of a conjoined motion of centring and hoisting of the vehicle respective to the direction defined by the guiding marks themselves, can then move it up to the station of parking in correspondence of the predetermined slot 300.

Laterally respective to the guides, there is the device 10 object of the present invention. FIG. 4 shows an operative configuration wherein the device 10 is positioned in correspondence of the said surface of temporary parking with guiding marks 210, 220, in this case on the left of the vehicle; said operative configuration is—as a matter of fact—that wherein the vehicle is already positioned in correspondence of the two guiding marks, but said vehicle is not represented for clarity of representation of the structure of the automated parking on the first elevation.

Figure 6:
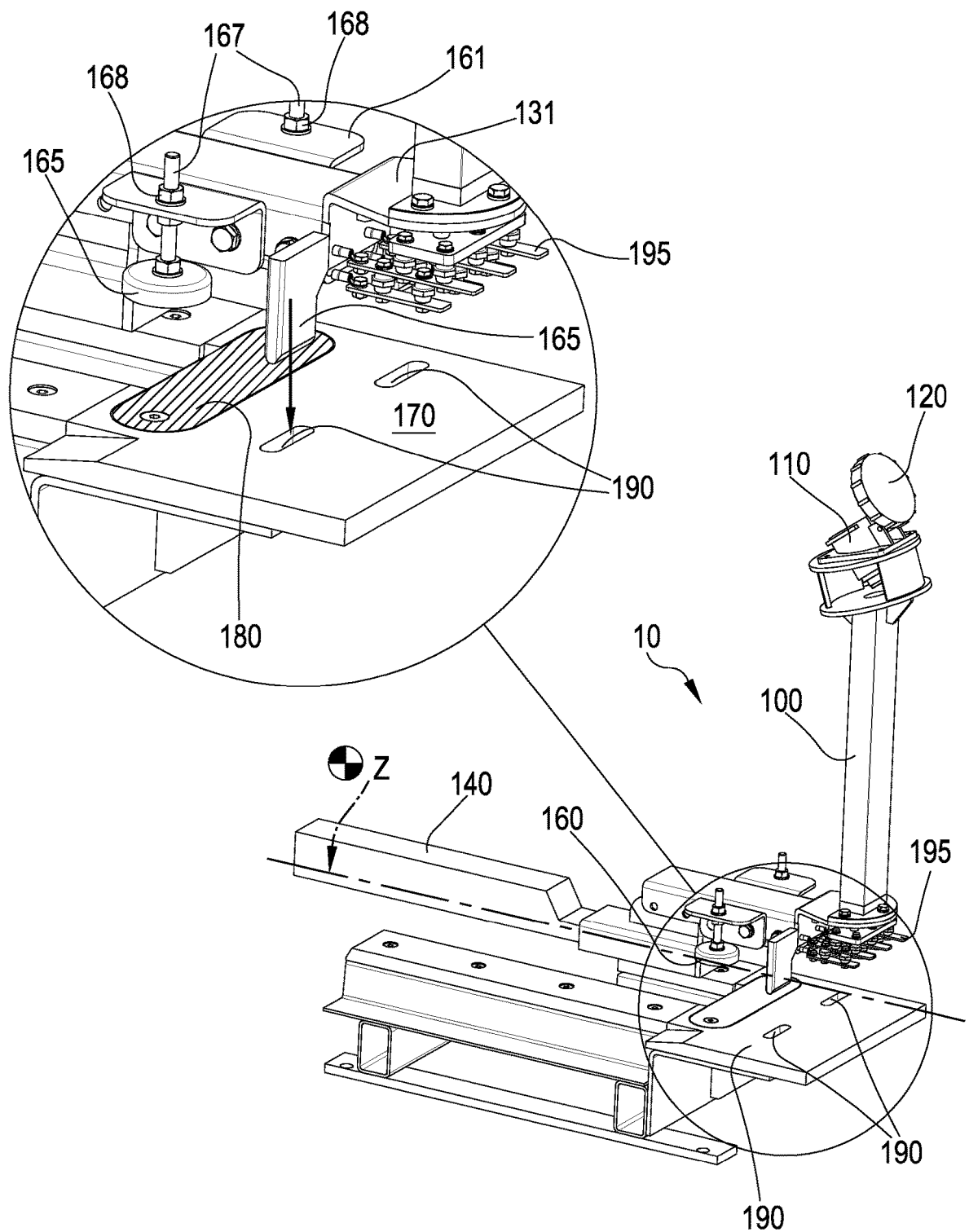
FIG. 6 shows a detail of removable mechanical connection between the device of FIG. 1 and a supporting plane thereof, arranged at the road level.

Into the operative configuration which is represented in FIG. 4, the device 10 object of the present invention is installed on the support 170 that is positioned laterally respective to the guiding marks—in this case the left—and that is in detail represented in FIG. 6. The device 10 object of the present invention, as better also subsequently described, can be moved respective to said guiding mark in such a way to be manually extracted from the support 170 realizing the magnetic disengagement of the magnet 160 for being replaced in a position which is remote with respect to the surface of temporary parking with guiding marks 210, 220 so that to allow advantageously having a greater freedom for moving the vehicle when this is extracted from the surface of temporary parking and/or is therein reintroduced.

Preferably the column 100 can be extracted by realizing a magnetic disengagement of the magnets 160 by means of a rotation respective to the vertical axis. Since the force of adhesion of the magnets is particularly strong, a rotation of the column 100 allows the user to exert a force which is sufficient to the disengagement which is lower respective to the force that would otherwise be necessary for proceeding with an extraction thereof purely along the vertical direction. Doing so, also persons less robust can easily extract the column 100 without that this leads to a reduction of the power of magnetic adhesion, that in contrast would compromise the stability of the column 100 itself when in operative position.

Figure 5:
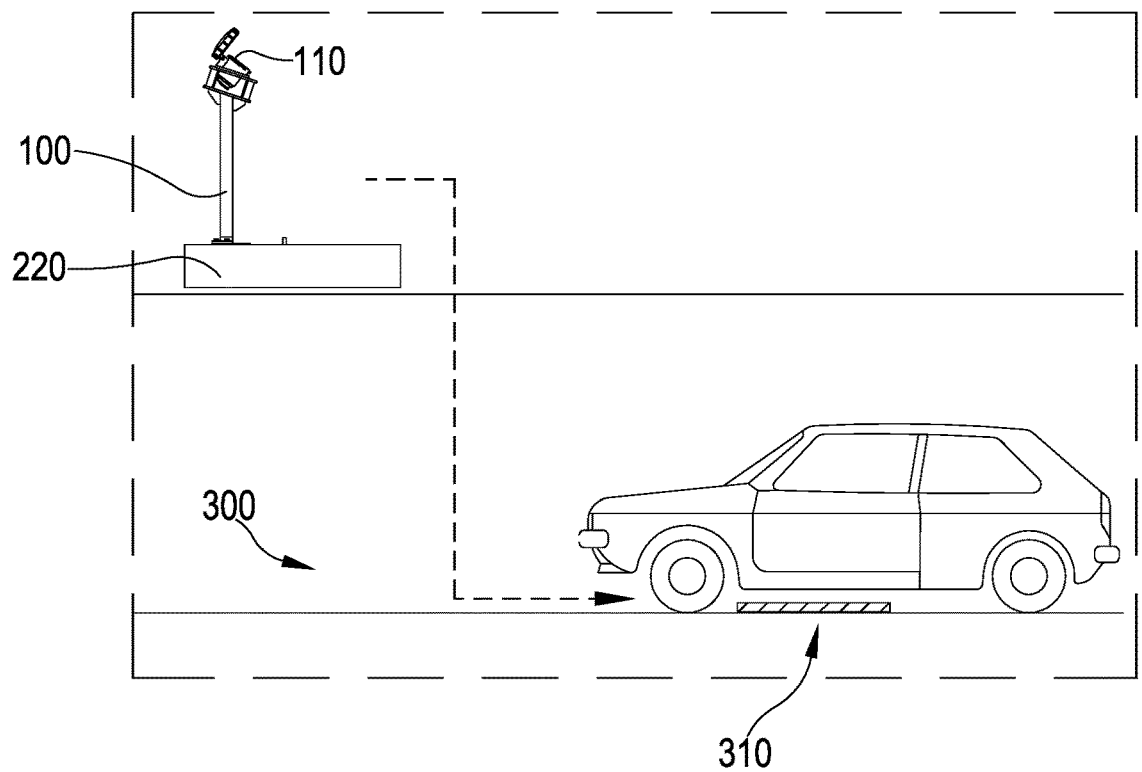
FIG. 5 shows a section view of an automated parking, where there is the device of FIG. 1, wherein a vehicle is parked in an area of parking at an elevation below the ground respective to the road level.

FIG. 5 instead shows a section view of an exemplificative and non-limiting embodiment of the parking object of the present invention. In detail, the parking object of the present invention has a station of parking on the predetermined slot 300 at a second elevation which is lower that the first elevation. Anyway said configuration shall not be intended as being limiting since the parking could otherwise be configured on a single elevation, but with two stations, one of arrival and extraction of the vehicle (surface of temporary parking) and a second of parking.

As it is shown in detail in FIG. 6, just below the device 10 object of the present invention, the automated parking, in correspondence of a first of a second guide 210, 220 of support of the vehicle has an area with a metal support 170, that is provided with a contact area 180 of a metal type that in use is positioned below the couple of magnets 160.

In particular, as schematically represented in FIGS. 4 and 6, the vehicle is parked at a first elevation or in a first station of said automated parking laying on a surface of temporary parking with guiding marks 210, 220 between which it is possible to make the carriage for moving vehicles slide. The metal support 170 is arranged laterally with respect to the surface of temporary parking with guiding marks 210 220 and in detail finds itself at an elevation substantially equal to the elevation of the road level.

As it is shown in detail in FIG. 6, a carriage for moving the vehicle has a tooth 140 suitable for introducing within the recess or profile 135.

Figure 7:
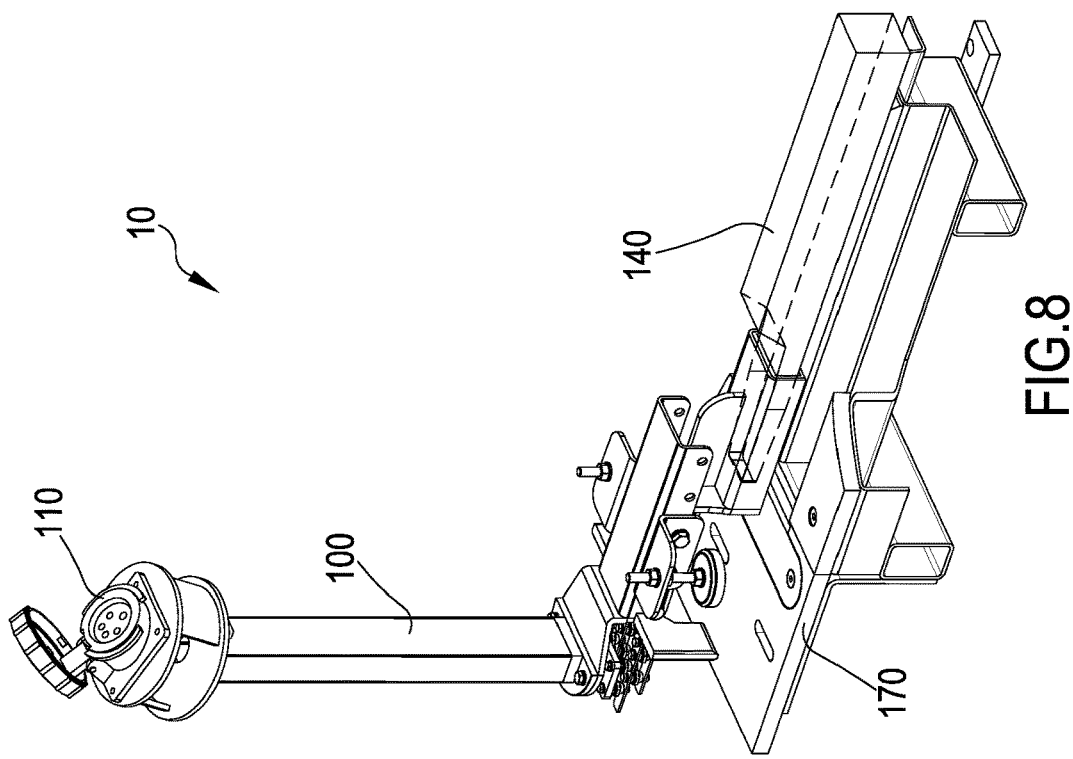
FIG. 7 shows a perspective view of the device of FIG. 1 in a configuration wherein a tooth of a carriage for moving vehicles is proximal to the introduction in a recess or box for hoisting and motion of the device itself.
Figure 8:
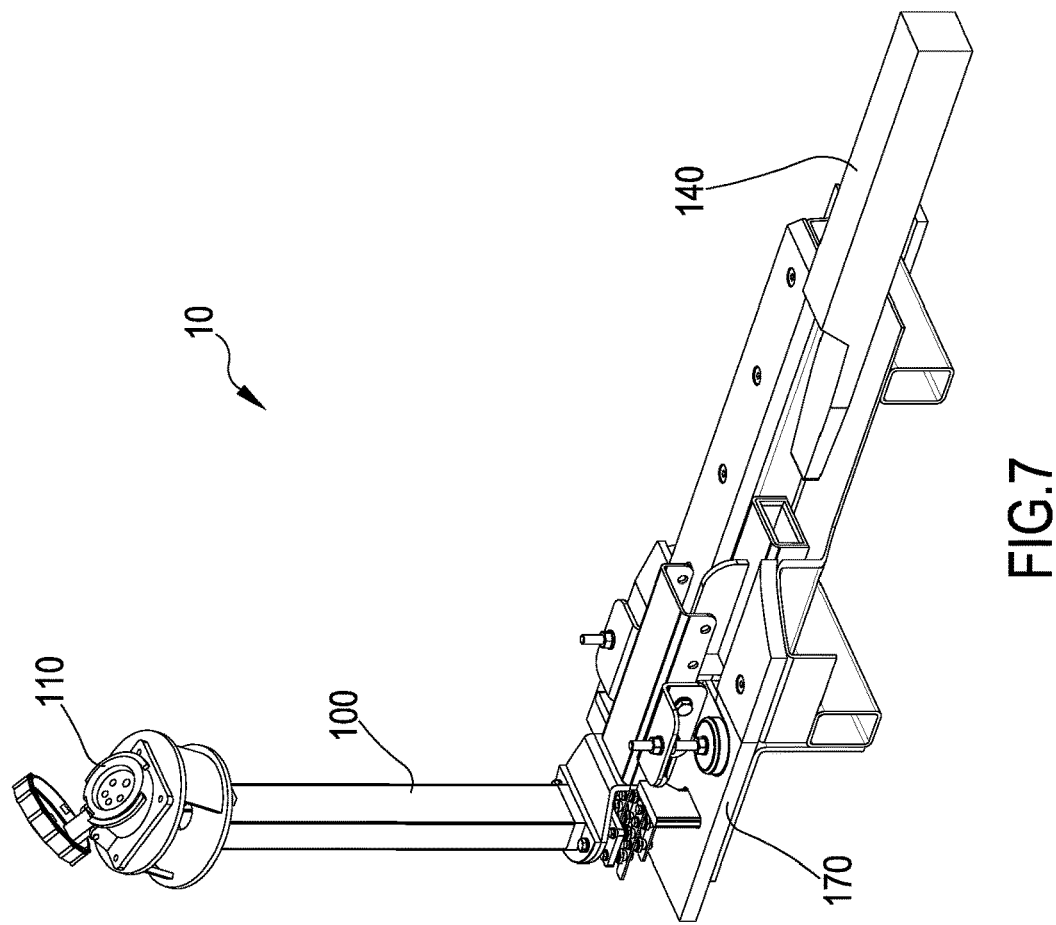
FIG. 8 shows a perspective view of the device of FIG. 1, in a configuration wherein a tooth of a carriage for moving vehicles is introduced in a recess or box for hoisting and moving the device itself.

In detail FIG. 7 shows a first operative configuration wherein the tooth 140 is not introduced within the recess or profile 135, while FIG. 8 represents a second operative configuration wherein the tooth 140 introduced in said recess or profile 135.

In the automated parking according to the present invention, therefore, the carriage for moving vehicles has a tooth axially movable in a direction substantially orthogonal to a longitudinal axis of the vehicle and slides in such a way to be linearly introducible at least partially inside said recess or profile 135.

In detail, FIG. 7 shows a configuration wherein the column 100 is introduced by means of supporting wings on the metal support 170 in such a way that the magnets 160 are in magnetic contact with the metal contact area 180 and the wings themselves are introduced into the slotted holes 190 in such a way that the column can rest in erected position having its own axis of longitudinal development substantially orthogonal respective to the road level.

The applicant underlines that in said condition the electric contacts 195, as well as the socket 110, are not electrically powered. Therefore, there is no risk of accidental electric contact with the user and neither its electrocution.

In case the vehicle is moved by the carriage for moving vehicles from a first elevation of parking (that is in correspondence of the first station of introduction and extraction of the vehicle) to a second elevation of parking, typically but in a non-limiting extent lower than the surface of temporary parking, towards a room of storage of a plurality of vehicles (or second station of parking), the tooth 140 is extracted from the carriage, engages the device 10 and drags it together with the vehicle up to a position of parking into the station of parking in a predetermined area 300, wherein said vehicle is stored for a predetermined amount of time and wherein the electric contacts 195 come into contact with coupling contacts 310.

The applicant underlines that the coupling contacts 310 are always electrically powered in case of sensing the electric load offered by the vehicle, differently are fed only with a low voltage contact that acts as a control signal. In other words, on the coupling contacts 310 always arrives a low voltage signal (for example in the order of 20V) on specific control contacts that through known procedures, only when it detects the presence of the socket, and that is only when the device 10 is coupled to the coupling contacts 310 with the socket correctly introduced in the vehicle, shows the presence of an electric load and enables a control board to feed the energy for recharging the vehicle. Therefore only in case the motion of the device 10 renders the electric contacts 195 in connection with the coupling contacts 310 there is a feeding of the socket 110 at a voltage up to 500V on the specific contacts.

Figure 9:
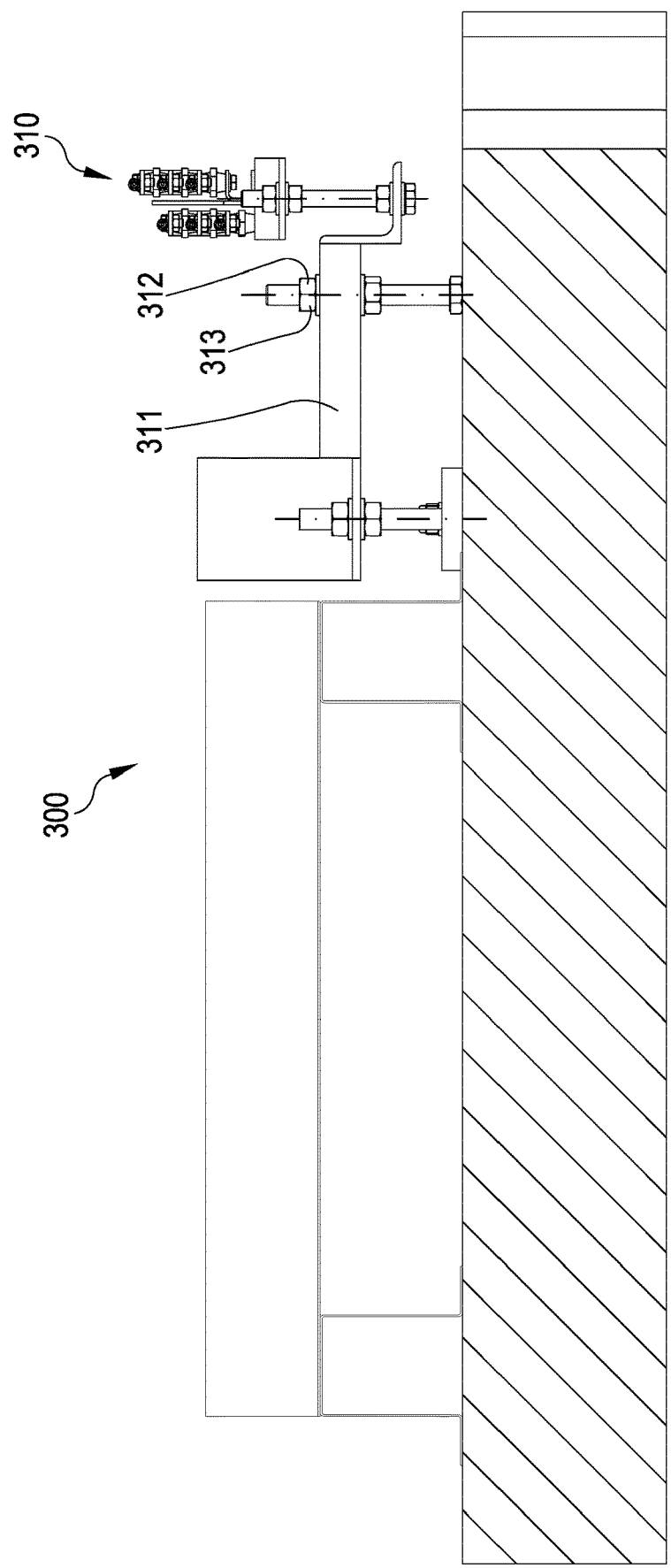
FIG. 9 shows a lateral view of a plurality of coupling contacts, electrically fed, that some conditions come into contact with electric contacts of the device of FIG. 1 and that are positioned in correspondence of a station of parking on a predetermined area of said automated parking.
Figure 10:
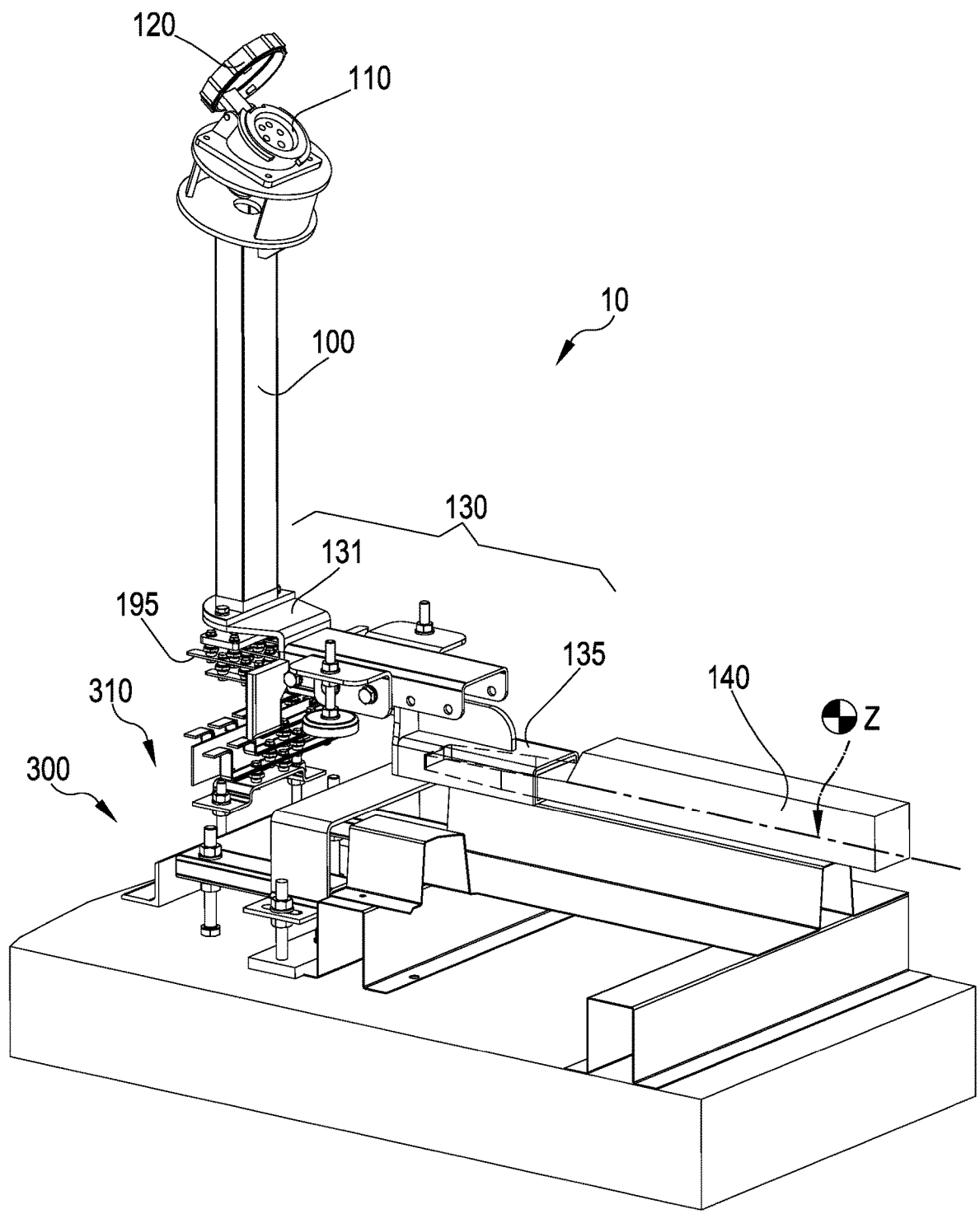
FIG. 10 shows a perspective view of the device of FIG. 1, close to be electrically connected with the coupling contacts of the station of parking on a predetermined area of the automated parking object of the present invention.
Figure 11:
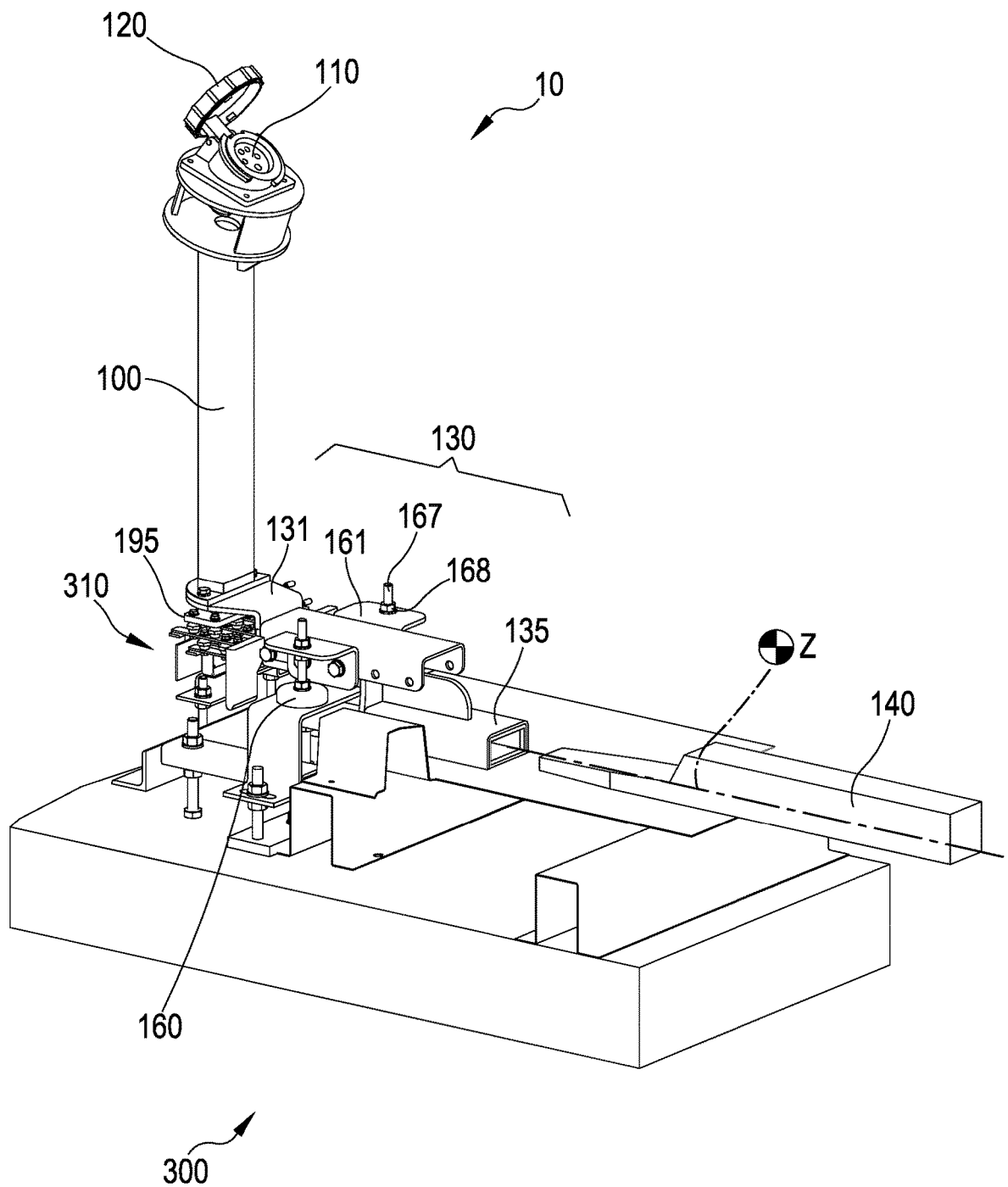
FIG. 11 shows a perspective view of the. device of FIG. 1, wherein the coupling contacts of the station of parking over a predetermined area of the automated parking are electrically connected with the electric contacts of the device of FIG. 1.
Figure 12:
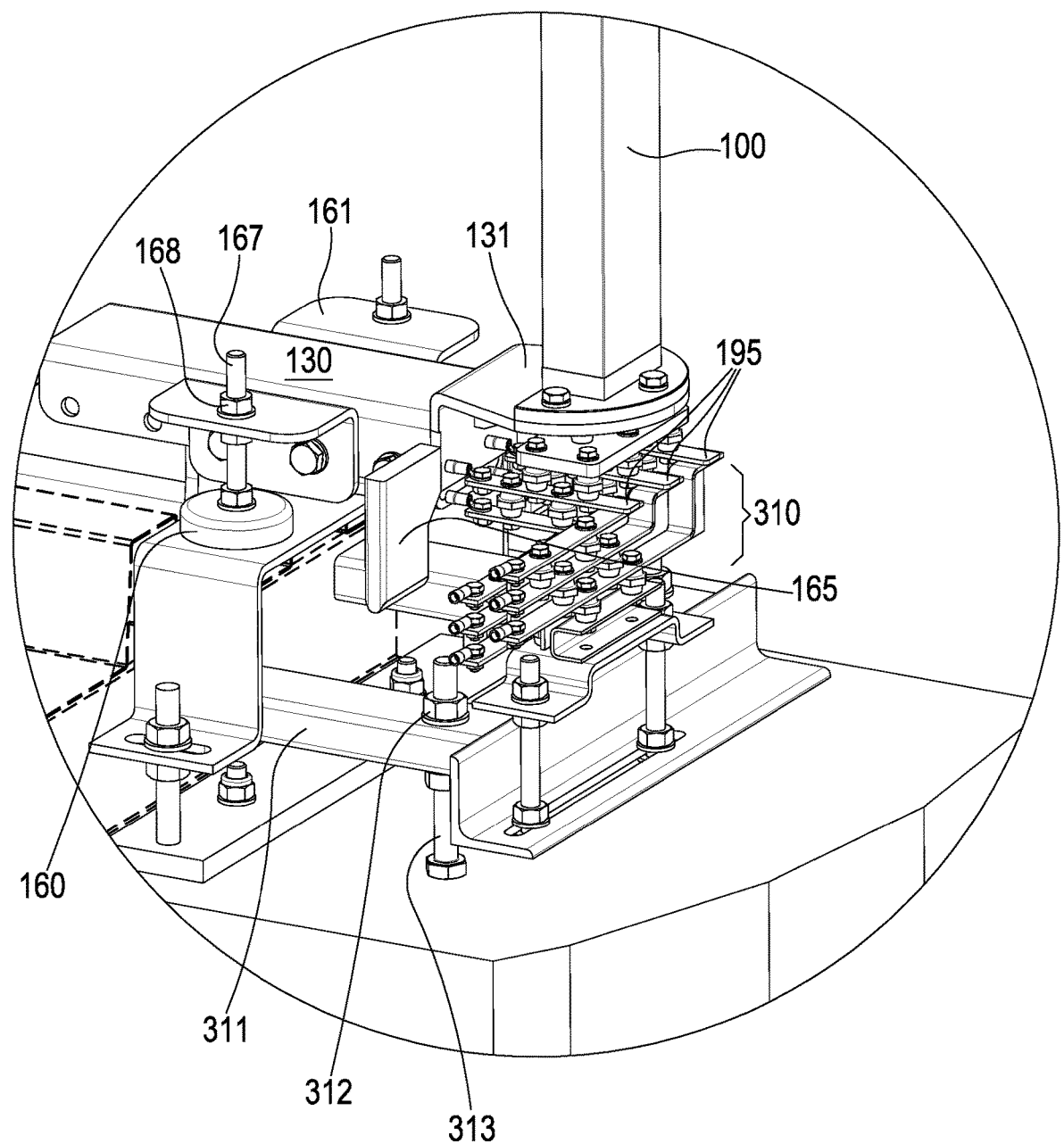
FIG. 12 shows a perspective detailed view of the connection of the electric contacts in said station of parking on a predetermined area.

As it is shown in FIG. 9, the coupling contacts 310 are configured in such a way to be they also be set in height respective to the ground of the station of parking in a predetermined area 300. The setting in height of the coupling contacts 310 takes place advantageously by means of a plurality of nuts and bolts 312, 313 that act on a supporting bracket of the coupling contacts 310 so that to set their height respective to the ground and their horizontal alignment. Advantageously this allows a greater freedom of positioning of the supporting structure 311, since the actual and precise coupling between the coupling contacts 310 and the electric contacts 195 of the device 10 can be set by means of releasing the nuts for locking the screws as well as by the electric contacts 195 that of the coupling contacts 310 in such a way that in case the carriage deposits the vehicle and the device 10 into the predefined position into the station of parking on a predetermined area 300, the various contacts come stably into reciprocal contact or in stopping, so that to ensure a solid transmission of the electric current.

In use, the user that desires performing a parking of an hybrid or electric vehicle in the automated parking according to the present invention, at first he positions the vehicle in correspondence of the surface of temporary parking with guiding marks 210, 220 in correspondence of the first elevation wherein there is the station of introduction and extraction of the vehicle. Then he extracts a cable of connection from the car and connects it to the socket which is present on the vehicle. Subsequently, it takes the device 10 from a position which is lateral with respect to the surface of temporary parking with guiding marks 210, 220 and manually moves it in such a way to introduce the wings 165 into the slotted holes 190 and thereby making the magnets 160 magnetically engage on the metal contact area 180. Then, the user inserts the connection cable also in correspondence of the socket 110.

During all these operations no electric power comes from the device 10 object of the present invention, and this advantageously allows the users to move and use the device 10 very safely, since there is no risk of electrocution.

Subsequently, the user selects by means of known user interface means the start-up of the procedure for automated parking of the vehicle in correspondence of the second elevation or anyway in correspondence of the station of parking on the predetermined slot 300.

The carriage of motion, electrically controlled by a PLC or equivalent technical means, performs therefore an automatic procedure of hoisting and cantering of the vehicle and linearly translates and moves it up to the second elevation into the station of parking on the predetermined slot 300 in correspondence of which there are coupling contacts 310.

During this operation, the translation of the vehicle takes place rigidly together with the device 10 object of the present invention.

The procedure of parking for vehicle in correspondence of the second elevation into the station of parking in a predetermined parking area 300 is therefore the phase wherein the electric contacts 195 are coupled with the coupling contacts 310. Then, there is electric powering for the socket 110 and a subsequent transfer of electric energy towards the batteries or anyway accumulators of the hybrid or electric vehicle that allow the recharge thereof.

The advantages of the device object of the present invention are clear in vie of the preceding description, in particular it allows a user of hybrid or electric vehicles of using a system of of recharge substantially automated also in automated parking that once were not conceived for being used with hybrid or electric vehicles or anyway assisted not only by an endothermic engine but also by an electric motor, thereby constituting also a retrofit system for updating automated parking.

Furthermore, the usage of the device 10 object of the present invention is particularly safe, since the user during the phases wherein he can access to the vehicle, never risks electrocution since the socket 110 is not electrically powered.

Through the device 10 and the automated parking object of the present invention, therefore, an hybrid or electric vehicle can be completely recharged in the most convenient situation for the recharge itself, and that is in case is parked in correspondence of an house of the user itself.

It is finally clear that to the device, to the automated parking, and to the method up to here described can be applied additions, adaptations or variants obvious for the skilled person, without for this departing from the scope of protection provided by the annexed claims.

The invention claimed is:

1. A charging device for hybrid or electric vehicles, said charging device comprising:
   a column disposed substantially vertically;
   a current socket positioned at a first terminal portion of said column;
   a supporting element of said column, disposed substantially orthogonal to said column;
   a receptacle suitable for receiving therein a tooth of a carriage for moving vehicles; and
   a plurality of electric contacts, each coupled to a respective electric contact of said current socket and positioned at a second terminal portion of said column opposite said first terminal portion,
   said electric contacts being not electrically powered when the charging device is not electrically coupled with coupling contacts of an automated parking system.

2. The charging device according to claim 1, wherein said supporting element includes a plurality of magnetized elements capable of allowing removable adhesion of said device to a supporting plate.

3. The charging device according to claim 1, further comprising a cap for covering said current socket, said cap being at least one of removable and rotatable, for accessing said current socket.

4. The charging device according to claim 1, further comprising a plurality of removable blocking members on a slotted supporting plate, said removable blocking members being such that they cause said charging device to rest in a substantially vertical position when positioned on said slotted supporting plate.

5. The charging device according to claim 2, wherein said magnetized elements are axially slidable with respect to a block of said supporting element, each said magnetized element fixed to said supporting element by means of a nut/bolt adapted for allowing axial sliding of said magnetized elements with respect to said supporting element and to affix the magnetized elements to said supporting element, wherein said axial sliding with respect to said supporting element takes place along a direction substantially parallel to the substantially vertically disposed column.

6. An automated parking system for recharging hybrid or electric vehicles, said automated parking system comprising:
   a surface of temporary parking with guiding marks for temporarily parking a vehicle therein;

a supporting plate associated with said surface of temporary parking and provided with slots for positioning a removable blocking of a charging device comprising
  a column disposed substantially vertically;
  a current socket positioned at a first terminal portion of said column;
  a supporting element of said column, disposed substantially orthogonal to said column;
  a receptacle suitable for receiving therein a tooth of a carriage for moving vehicles; and
  a plurality of electric contacts, each coupled to a respective electric contact of said current socket and positioned at a second terminal portion of said column opposite said first terminal portion,
  said electric contacts being not electrically powered when the charging device is not electrically coupled with coupling contacts of an automated parking system
; and
a plurality of coupling contacts positioned in a corresponding parking station in a predetermined area, said parking station distinguished from a station of introduction and extraction of the vehicle,
wherein said coupling contacts are configured for coupling electrically with said electric contacts of said device, are connected to an electric source, and provide electricity to said electric contacts of said charging device only in case of contact therewith.

7. The automated parking system according to claim 6, further comprising a carriage for moving vehicles, said carriage movable with respect to said surface of temporary parking and suitable for at least one of translating and hoisting said vehicle from and towards the surface of temporary parking,
  wherein said carriage comprises a tooth suitable for introduction within said receptacle, and is configured for moving said vehicle together with said device from said station of introduction and extraction of the vehicle, to said parking station, in a parking configuration wherein said electric contacts of said device are in electric contact with the coupling contacts and are electrically powered therefrom.

8. The automated parking system according to claim 6, wherein said supporting plate comprises a metal contact area positioned below said magnetized elements, and a plurality of slotted holes for engagement of said charging device, positioned frontally with respect to said metal contact area.

9. A method of automatic recharge of an electric or hybrid vehicle in an automated parking system, said method comprising:
  positioning said vehicle in a first position in a station of introduction and extraction of the vehicle in said automated parking system;
  positioning on a supporting plate, a charging device comprising
    a column disposed substantially vertically;
    a current socket positioned at a first terminal portion of said column;
    a supporting element of said column, disposed substantially orthogonal to said column;
    a receptacle suitable for receiving therein a tooth of a carriage for moving vehicles; and
    a plurality of electric contacts, each coupled to a respective electric contact of said current socket and positioned at a second terminal portion of said column opposite said first terminal portion, said electric contacts being not electrically powered when the charging device is not electrically coupled with coupling contacts of an automated parking system, maintaining the electric contacts of said charging device disengaged;
  connecting said current socket to a socket of the vehicle with an electric connection cable;
  moving said vehicle together with said charging device to a parking station in a predetermined area that includes a corresponding plurality of coupling contacts configured for removably engaging said electric contacts,
  wherein said moving takes place using a carriage for automatically moving vehicles.

10. The method according to claim 9, wherein said positioning the device comprises removably magnetically engaging a plurality of magnets of said device on a contact area of said supporting plate; and wherein said magnetic engagement is removable by mechanical action of conjoined motion of the vehicle and the device by said carriage for automatically moving vehicles.

* * * * *